Patented Sept. 12, 1950

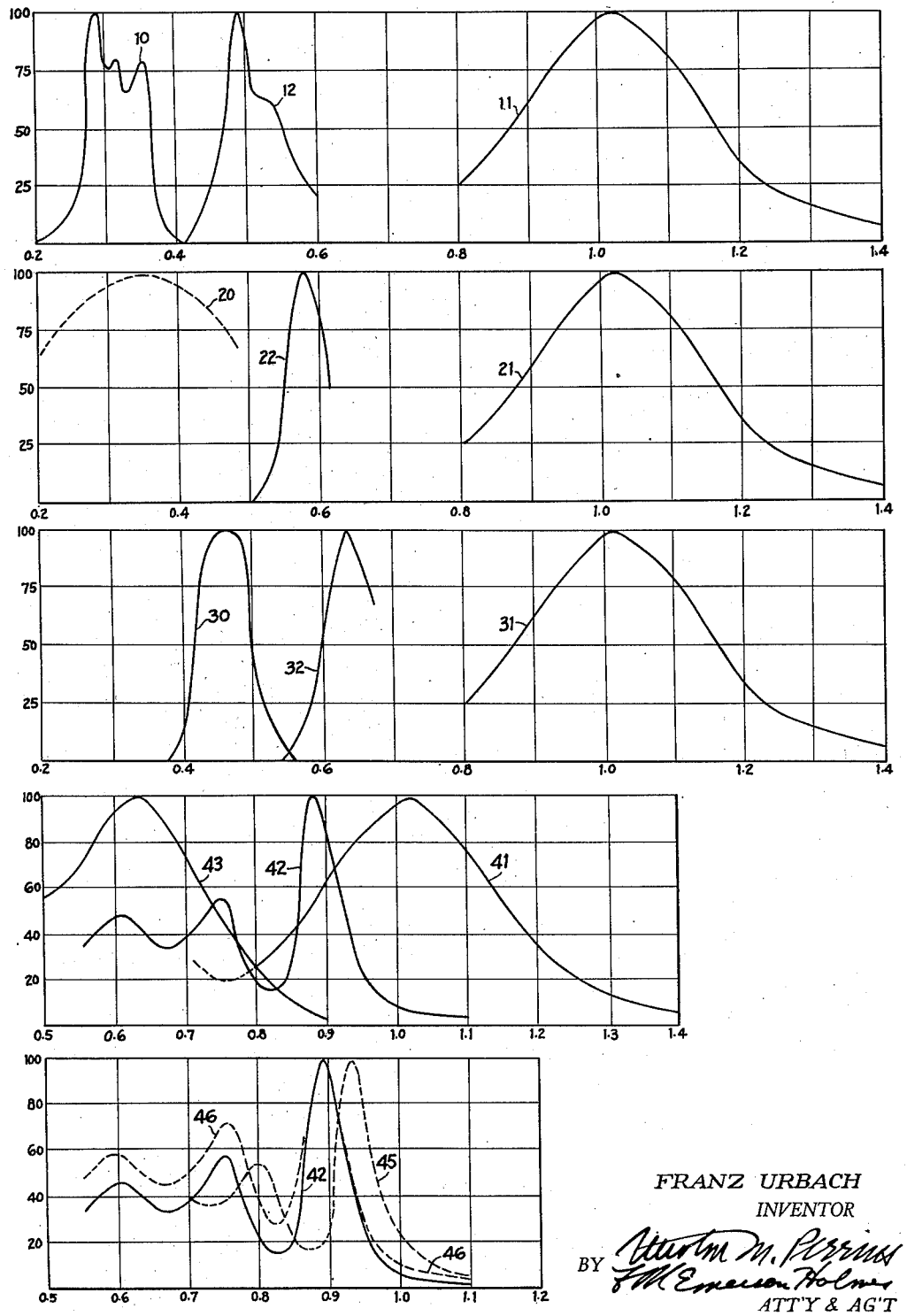

2,522,074

UNITED STATES PATENT OFFICE 2,522,074

METHOD OF RENDERING INFRARED RADIATION VISIBLE EMPLOYING DOUBLY ACTIVATED ALKALINE EARTH SULFIDE PHOSPHORS

Franz Urbach, Rochester, N. Y., assignor to University of Rochester, Rochester, N. Y., a corporation of New York Application May 3, 1946, Serial No. 667,013

1 Claim. (Cl. 252—301.4)

This invention relates to luminescent materials and particularly to infrared sensitive phosphors.

The statement of the objects and purposes of the present invention can be made most concisely and intelligibly only after the definitions of the terminology here employed and after a discussion of the prior art. Therefore, the objects of the invention are listed immediately following the table toward the end of the specification.

The invention is limited to inorganic phosphors such as those which are commonly made by heating or firing a matrix consisting of a phosphor base, a flux and a trace of foreign substance called an activator. Ordinary phosphors emit visible light when excited by ultraviolet light (or X-rays, radioactive radiations or the like). Light emitted during excitation or within a few milliseconds thereafter is referred to as fluorescence while that emitted after the excitation has been terminated is referred to as phosphorescence. Infrared sensitive phosphors are of two types, first those which preferably have little spontaneous phosphorescence called afterglow or background, but which have their emission enhanced by infrared radiation. This phenomenon is called stimulation. It appears as a flare-up often not of the same color as the afterglow of the excited phosphor.

In the second type of infrared sensitive phosphors the afterglow is diminished in brightness without any appreciable enhancement of the emission when exposed to infrared radiation. This latter phenomenon is called quenching. The net result of either quenching or stimulation or both, is extinction of the phosphorescence. The ratio of the stimulated brightness to the intensity of the stimulating radiation is called the stimulability of the phosphor. The decrease in stimulability on continued exposure is called exhaustion and may or may not be accompanied by extinction of the afterglow. The dependence on wavelength of excitation, emission, stimulation, quenching, extinction and exhaustion is characterized by combining the word "spectrum" with the term of the phenomenon. Emission under stimulation may, in some cases, not reach its maximum brightness immediately due to "the inertia of stimulation" and may continue at an unusually high level after the stimulating radiation is cut off due to "time lag of stimulation." The fact that stimulation effects are best observable with phosphors having relatively poor spontaneous afterglow, combined with prior tendencies to investigate only phosphors with high afterglow, may serve in part to explain why the principles of the present invention have not previously been discovered.

One essential feature of the present invention is the fact that the phosphor must contain at least two activators one of which will be referred to as the dominant activator and the other as the auxiliary activator. Neither activator alone would be sufficient to give any useful degree of infrared stimulability but both of them together produce a high infrared stimulabaility in the phosphor. The dominant one is selected in accordance with its excitation and its emission spectrum. The emission spectrum of the phosphor obtained upon stimulation according to the present invention is determined entirely, as far as photometric measurements can ascertain, by the dominant activator. The stimulation spectrum is apparently controlled entirely by the auxiliary activator as indicated by the following characteristics. Different phosphors according to the present invention, but all having the same auxiliary activator will have substantially identical stimulation spectra. Phosphors containing only the auxiliary activator will have an infrared extinction spectrum with low sensitivity, which corresponds to the stimulation spectrum of the phosphor according to the present invention. Of course this invention will remain valuable even if someday the theory thereof is proven incomplete, and the theory is of value in the meantime. Another characteristic of the present invention is that the presence of the auxiliary activator, in a phosphor which also contains a dominant activator, causes the spontaneous afterglow of the phosphor to be less than that of a similar phosphor containing the dominant activator alone. Almost invariably it is also true that the dominant activator causes the spontaneous afterglow of the auxiliary activator to be reduced. This latter phenomenon may not be as essential as the others, but in general the afterglow of a phosphor containing both activators is less than that of phosphors containing either of the activators alone. Incidentally the spontaneous afterglow spectrum may be determined by either or both of the activators.

Before discussing the preferred compositions according to the present invention which actually has been extended to many different compositions, a brief history of the art and of the invention will simplify the understanding of the invention. Possibly the publication most relied on by workers in this field is the Handbuch der Experimental Physik XXIII by P. Lenard. In this comprehensive work there are many useful hints and guides to the preparation of phosphors, there are some recipes which apparently cannot now be reproduced and there are some theories which may have led workers away from the present invention. Lenard's theory that infrared stimulation, the prior low sensitivity type, is produced by local heating appears to be inadequate to explain the high sensitivity available by the present invention. Although Lenard observed the phenomenon of stimulability, he failed to recognize that two activators were present in any of his samples and even if he unintentionally had more than one activator present, his results did not show the characteristics of the present invention. This is indicated by Lenard's discussion of what he termed "the light sum" namely all of the light available from the phosphor by heating; Lenard believed that heating a phosphor released all of the light energy therein. The factor in question is now termed "the thermal light sum." The total emission by stimulation (now called the optical light sum), was, according to Lenard, always less than the thermal light sum, the difference being ascribed to quenching. Phosphors according to the present invention have an optical light sum greater, sometimes as much as 100 times greater, than the thermal light sum. It should be noted that high stimulability and large optical light sum are not necessarily directly related.

In fact Lenard's theory of the phosphorescent process taking place within what he termed "centers" made it difficult if not prohibitive for him to recognize the possibility of any activator interaction.

Another pertinent highlight of the prior art is that represented by the high stimulability phosphors described in U. S. Patent 2,074,226, Kunz and Urbach, granted March 16, 1937, which were used at Dry Ice temperatures or liquid air temperatures or the like. Apparently the low temperature reduces the spontaneous afterglow and lengthens its duration so that there is considerable energy stored up to be released by stimulation. It is conceivable that in the future a phosphor may be made using only a single activator but having high infrared stimulability at room temperatures. The present invention obtains these results by using two activators.

In certain embodiments of the invention, the ideal phosphor, particularly for the detection of infrared light or the viewing of infrared images has a high stimulability and weak spontaneous afterglow. There are two general types of phosphors known to have low afterglow or background. First there is the type in which most of the excited energy is expended within a very short time, but this is obviously unsuitable for stimulation effects since little energy is stored. The other phosphors store large amounts of energy and release it slowly at room temperature but usually have a strong thermo-luminescence. They show a strong afterglow at high temperatures. Such phosphors may or may not have high stimulability by infrared light. For example it is possible to have phosphors with but a single activator and with strong afterglow at high temperature, such as bismuth activated calcium oxide, but these show only very weak stimulation by infra red light. Certain natural minerals are in this class.

In the testing of the present invention, the exploration of its properties and the formulation of explanations of the phenomena, over 15,000 infrared sensitive phosphors have already been produced. When one considers the complexities in the manufacture of even a single phosphor, one realizes the enormous amount of work which has been involved in proving the present invention which was first discovered purely accidentally by using an unusual contaminated activator. In the urgency of the recent war, the development of certain species of the present invention was carried on cooperatively with me by various major laboratories throughout the country so that the 15,000 figure mentioned above actually represents only a portion of the work done in the development and extension of the present invention.

Certain of the double or multiple activator phosphors of high infrared sensitivity according to the present invention have the preferred weak afterglow and high light storage. Apparently either or both of these effects may be brought about by the interaction of two activators. The two activators may give a weaker afterglow than either activator alone, but this very desirable side effect of the activator interaction is obviously not the sole cause of the increased stimulability of the dominant activator by the auxiliary activator.

The present invention is applicable to various phosphorescent bases and certain pairs of activators have been tried with selenides, silicates, etc., but preferably the invention employs a sulfide. The term sulfide is here used to include complex salts such as sulfide-selenides and also not to exclude the possible presence of sulfates, oxides, carbonates and polysulfides. This broad meaning of the term sulfide was adopted by Lenard and is common in the phosphor art, because it is difficult to state when a sulfide phosphor is entirely free of sulfate and in a preferred embodiment of the present invention a minimum proportion of sulfate is purposely included. In this preferred embodiment the amount of sulfate depends on the amount of flux and should be greater than 10% of the amount of flux. It should never be greater than 50% of the total weight of the phosphor, preferably less than 25%. It is often convenient to consider the sulfate as part of the flux and it will be so considered here but this does not necessarily mean that its action is merely fluxing. A small amount of the oxide is not too harmful to the phosphor but the amount should never exceed 5%. The sulfide may be any one or more of the group including magnesium, calcium, zinc, strontium, cadmium, and barium and preferably is one of the alkaline earth metal (calcium, strontium, and barium) sulfides. The most preferred embodiments are strontium sulfides and for some purpose calcium sulfides and in fact, strontium sulfides fluxed with calcium fluoride are known to contain some calcium sulfide.

The two activators are preferably selected from the group consisting of samarium, europium, cerium, manganese, bismuth, lead, copper, vanadium, tin, iron, antimony, praesodymium, neodymium, silver, and nickel. When samarium is present it is usually the auxiliary activator although if combined with bismuth, the samarium appears to be the dominant activator. The preferred embodiment of the invention has samarium as one of the activators and the other activator selected from the remainder of this group. Strontium sulfide or calcium sulfide or mixed lattice of calcium strontium sulfide, activated with samarium and europium is a preferred embodiment and these same sulfides activated with samarium and cerium is another preferred embodiment giving high infrared stimulability. The samarium-europium combination works well with other bases such as strontium selenide-strontium sulfide. Also zinc sulfide activated with manganese and copper, or lead and copper, works satisfactorily in accordance with the present invention—the unusual proportion of lead required for optimal results not being my invention specifically.

Thus the preferred auxiliary activators are samarium, bismuth, iron, and tin (the latter two being less important in the infrared stimulability embodiments). The dominant activators are preferably europium, cerium, manganese, lead, copper or nickel although for certain purposes as mentioned above samarium can be the dominant activator with bismuth as the auxiliary one. Certain of the other embodiments mentioned have special properties such as inertia of stimulation which are advantageous for some purposes and disadvantageous for others.

The use of two or more activators in a single phosphor is not broadly new, they have been used "co-actively" but no one has previously combined activators to gain infrared sensitivity. Combined activators have been used, for example, to control the color of spontaneous afterglow or phosphorescence or preferably the color of the fluorescence. Also multiple activator phosphors have been used for controlling the excitation spectrum. Rothschild in Phys. Z. 37, 757 (1936) even investigated samarium-bismuth combinations for obtaining samarium luminescence excitable by violet light. Because of the high afterglow, the phosphors most satisfactory for Rothschild's purpose are the ones least satisfactory for infrared stimulation. Rothschild's article is not at all concerned with infrared stimulability. As pointed out above, the present invention requires combinations of activators which reduce afterglow. The preparation of phosphors is admitted to be a complicated procedure. Many recipes have been published and most of them are reproducable by those skilled in the art. The effects of employing various firing temperatures have been discussed repeatedly in the literature as has the obtaining of oxygen-free phosphors by firing a matrix in a reducing atmosphere. One method of controlling the amount of sulfate in a phosphor according to the present invention is first to produce a phosphor having at most only a small amount of oxygen containing compounds, by firing in a reducing atmosphere and then to add the desired amounts of oxygen-containing compounds followed by re-firing. Alternatively the amount of oxygen in the atmosphere during the first firing can be easily controlled, for example by merely leaving the oven door slightly ajar during firing. This is the usual procedure and is quite satisfactory in the present case. A third method of controlling the sulfate content of the phosphor is to reduce the sulfate formed simultaneously with the sulfide by means of a reducing agent such as illuminating gas, carbon disulfide, nitrogen, hydrogen or hydrogen sulfide. As a fourth alternative, the amount of sulfate can be increased by the introduction of air or oxygen either during the firing process or during the cooling period. Or fifth, sugar, starch, carbon containing compounds or other reducing agents may be introduced into the charge to act as reducing agents.

Specific examples of preferred embodiments of my invention are as follows:

*Example I.*—An infrared sensitive, cerium-samarium activated, strontium sulfide phosphor is prepared as follows: To 1200 g. of strontium carbonate contained in a four liter beaker are added solutions containing 0.048 g. of samarium and 0.120 g. of cerium. The contents of the beaker are then slurried with water, well mixed and dried. The activated carbonate is transferred to a ball mill and mixed with 60 per cent of sulphur, by weight. This mixture is converted into "activated sulfide" which contains some sulphate, by firing it at 1200° C. for 15 minutes in an atmosphere of dry hydrogen sulfide. The firing is carried out in 70 ml. platinum crucibles covered with loose fitting lids. Quartz or porcelain can be used during the process of conversion of carbonate to sulfide, but quartz and porcelain crucibles are attached by lithium fluoride at the temperature used for fluxing and cannot, therefore, be used during that process.

The activated sulfide is then ground together with 20 parts by weight of calcium fluoride and 40 parts by weight of sulphur, there being 10 parts of the above sulfide to one part of the sulphur-flux mixture. The whole is thoroughly mixed and converted to the phosphor by heating the mixture for 20 minutes at 1000° C. in an atmosphere of hydrogen sulfide.

This particular phosphor is quite satisfactory for application as paint or by spraying using some non-aqueous vehicle such as methacrylate resin with either toluene or xylene as a solvent. It is preferable to have a fine powder for this purpose and the reduction of brightness which often accompanies the grinding of phosphors to fine powders may be overcome in some degree first by the use of magnesium oxide as a filler which renders the phosphor cakes brittle and much more easily pulverized and then by reheating the combination of the pulverized material and the filler to temperatures not sufficient to cause appreciable coalescence of the particles. Twenty per cent by weight of magnesium oxide is quite satisfactory and may be added to the strontium carbonate at the start of the preparation. After the phosphor has been fired and reduced to 5 to 10 micron size by ball milling it is regenerated by heating for 15 minutes at 600° C. in an atmosphere of hydrogen sulfide.

*Example II.*—Strontium sulfide-sulfate activated by manganese and samarium is prepared as follows: To 1200 g. of strontium carbonate contained in a four liter beaker are added solutions containing 7.2 g. of manganese and 0.240 g. of samarium. The contents of the beaker are then slurried with water, well mixed and dried. The activated carbonate is transferred to a ball mill and mixed with 60 per cent of sulphur by weight. This mixture is converted into "activated sulfide" by firing it at 1200° C. for 15 minutes in an atmosphere of dry hydrogen sulfide. The firing is carried out in 70 ml. platinum crucibles covered with loose fitting lids.

The sulfide is then ground in the mill together with 20 parts by weight of calcium fluoride and 40 parts by weight of sulfur. The fluxing operation to form the phosphor takes place at 1000° C. in an atmosphere of hydrogen sulfide. The material is heated for 20 minutes. A fine powder may be prepared with a procedure like that described for Example I.

*Example III.*—For many purposes this strontium sulfide activated by samarium-europium is the most preferable one and is prepared as follows: To 46 grams of purified strontium carbonate is added $8.48 \times 10^{-3}$ grams ($5.63 \times 10^{-5}$ gram atoms) of samarium and $8.64 \times 10^{-3}$ grams ($5.66 \times 10^{-5}$ gram atoms) of europium. The activators are added as dilute solutions of appropriate concentrations. The resulting suspension is stirred to a thin slurry which is cautiously evaporated to dryness. The dried, activated strontium carbonate is then mixed with 24 grams of sulphur, placed in a platinum crucible, and heated at 1200° C. for ten minutes. It is assumed that each 5.6 grams of strontium carbonate yields 5 grams of strontium sulphide by this treatment. Accordingly each gram of sulphide contains $2.12 \times 10^{-4}$ grams ($1.41 \times 10^{-6}$ gram atoms) of samarium and $2.16 \times 10^{-4}$ grams ($1.42 \times 10^{-6}$ gram atoms) of europium.

For each gram of strontium sulphide resulting from the above treatment is added 0.06 gram of calcium fluoride and 0.04 gram of sulphur. The whole is thoroughly mixed and converted to the phosphor by heating the mixture, contained in the platinum crucible, at 1000° C. for twenty minutes.

For focal surfaces in optical devices, the phosphors are fabricated to precise shapes, usually flat or slightly concave or convex, which are referred to herein as approximately flat, to distinguish from the tubular surfaces of phosphorescent lamps.

The composition of further examples, including some synthesized first in other laboratories, is indicated in the following table:

| Example | Base | Flux | Activators, in parts per million |
|---|---|---|---|
| IV | SrS | LiF | Cu 100, Sm 20. |
| V | SrS | LiF | Ce 100, Sn 10,000. |
| VI | SrS | LiF | Cu 100, Bi 100. |
| VII | SrSe-SrSO₃ | CaF₂ | Eu 100, Sm 100. |
| VIII | SrSe-SrSO₃ | CaF₂ | Eu 100, Bi 100. |
| IX | ZnS | NaCl | Mn 200, Cu 1. |
| X | ZnS | NaCl | Pb 40,000, Cu 1. |
| XI | ZnS | NaCl | Pb 40,000, Cu 20. |

The objects of the invention are to produce phosphors having:

1. High stimulability, particularly at room temperature and much higher than previously known phosphors.
2. Infra red stimulability, particularly in certain embodiments.
3. Stimulability which is controllable or selectable with respect to the spectral range both of the stimulation and of the emission.
4. Long life stimulability, i. e. high dark storage value giving useful stimulability after hours, days, and even weeks of storage.
5. In certain embodiments, slow exhaustion of the stimulability, i. e. long life during use as compared to long life during storage. Note that other embodiments, developed for special purposes, preferably have rapid exhaustion.
6. Low afterglow so as to present a minimum of background which reduces the contrast of the stimulated emission.
7. In certain embodiments, low threshold, i. e. high threshold sensitivity, to infrared radiation.
8. In certain embodiments, little if any inertia of stimulation or time lag of stimulation.
9. The combination of infrared stimulability and an emission spectrum to which the scotopic eye is particularly sensitive.
10. Other special characteristics in embodiments for special purposes and general characteristics such as ease of manufacture, workability, and non-prohibitive costs.

The accompanying drawing includes a number of graphs showing the excitation, stimulation and emission spectra for phosphors according to the present invention.

Curves 10, 11 and 12 are respectively the excitation, stimulation and emission spectra for Example I. Curves 20, 21, and 22 similarly correspond to Example II and curves 30, 31, and 32 similarly correspond to Example III. Curve 20 is broken since the measurements thereon are not as precise as the others. It will be noted that since samarium is the auxiliary activator in each of these examples, the stimulation spectra are equivalent. Bismuth or tin will behave as auxiliary activators with europium, manganese, cerium, or copper and when bismuth and samarium are used together the samarium behaves as the dominant activator giving a stimulation spectrum indicated roughly by the curve 42 corresponding to bismuth. The stimulation spectrum depends on the auxiliary activator used. Such stimulation spectra are shown superimposed for comparison as curves 41 for samarium, 42 for bismuth and 43 for tin in strontium sulfide. All curves are drawn on an arbitrary ordinate scale with the maximum at 100 since it is not possible to compare absolute values of stimulability of the different activators. The curves 41, 42, and 43 indicate that the longest wavelength infrared stimulability is with samarium, whereas tin gives a stimulability in the visible red region of the spectrum. Curves 42, 45, and 46 all relate to bismuth as an auxiliary activator. Curve 42 shows the effect of bismuth as an auxiliary activator in strontium sulfide. Curve 45 shows the effect of bismuth as an auxiliary activator in strontium sulfide-strontium selenide. When bismuth is used as the sole activator in strontium sulfide the phosphor is peculiarly sensitive to quenching and the quenching spectrum is that shown by curve 46. This tends to confirm the above-discussed relationship between the dominant and the auxiliary activators. Samarium is the preferable material to use as an auxiliary activator for producing stimulation around and beyond $1\mu$ and therefore samarium with europium, cerium, manganese, lead, copper, or nickel constitute the preferable activator compositions. The choice of dominant activator depends partly on the emission band desired i. e. depends on whether the phosphor is to be used with photographic emulsions or for example with the scotopic (dark-adapted) eye.

The original examples of europium-samarium activators were made up to include gadolinium and while this additional material seems to be an advantage in some cases it is not essential.

There are indications that many of the rare earths are useful as activators, usually as auxiliary activators. There is however, considerable difficulty in attempting to obtain pure rare earths even in the small quantities here used and therefore it is difficult to distinguish between the effect of the rare earth being tested and the possible effect of other rare earths such as samarium which may also be present. Obviously the effect of the rarer rare earth may well be overshadowed by the presence of samarium.

Cross reference is made to my three applications Serial Nos. 657,135, now Patent No. 2,482,813, 657,136, and 657,137, now Patent No. 2,482,815, filed March 26, 1946, having to do with particular uses of phosphors having the properties of stimulation or extinction. Phosphors according to the present invention are also useful in optical instruments such as those described in U. S. Patent 2,074,226 Kunz and Urbach, above referred to.

It is to be understood that the invention is not limited to the particular preferred phosphors herein described but is of the scope of the appended claim.

I claim:

The method of rendering infrared radiation visible which comprises substantially uniformly exciting a phosphor made up of a base material selected from the group consisting of the sulfides of calcium, strontium and barium activated by two activators, one a dominant activator selected from the group consisting of europium, cerium, manganese, copper, and samarium and the other an auxiliary activator different from the dominant activator selected from the group consisting of samarium, bismuth and tin, said phosphor having infrared stimulability not present in a similar phosphor containing either of the two activators alone, allowing said phosphor to relax long enough to reduce spontaneous afterglow but not long enough to eliminate stimulability and then allowing said infrared radiation to fall on said excited, double activated phosphor.

FRANZ URBACH.

REFERENCES CITED

The following references are of record in the file of this patent:

UNITED STATES PATENTS

| Number | Name | Date |
|---|---|---|
| 1,891,827 | Mines | Dec. 20, 1932 |
| 2,049,765 | Fischer | Aug. 4, 1936 |
| 2,126,233 | Wakenhut | Aug. 9, 1938 |
| 2,361,467 | Fernberger | Oct. 31, 1944 |
| 2,372,071 | Fernberger | Mar. 20, 1945 |

FOREIGN PATENTS

| Number | Country | Date |
|---|---|---|
| 440,818 | Great Britain | Jan. 7, 1931 |
| 484,696 | Great Britain | 1938 |

OTHER REFERENCES

Cathodoluminescence, by Nichols, Howes and Wilbur, 1928, pages 46 and 107.